(12) United States Patent
Delorenzis

(10) Patent No.: US 10,118,453 B2
(45) Date of Patent: Nov. 6, 2018

(54) DAMPING AIR SPRING WITH STAGED OPENINGS

(71) Applicant: HENDRICKSON USA, L.L.C., Itasca, IL (US)

(72) Inventor: Damon Delorenzis, Plainfield, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 6 days.

(21) Appl. No.: 15/364,439

(22) Filed: Nov. 30, 2016

(65) Prior Publication Data

US 2017/0151848 A1   Jun. 1, 2017

Related U.S. Application Data

(60) Provisional application No. 62/261,554, filed on Dec. 1, 2015.

(51) Int. Cl.

| F16F 9/05 | (2006.01) |
|---|---|
| B60G 15/12 | (2006.01) |
| B60G 11/27 | (2006.01) |
| B60G 11/28 | (2006.01) |
| F16F 9/04 | (2006.01) |
| B60G 13/10 | (2006.01) |

(52) U.S. Cl.
CPC .............. *B60G 15/12* (2013.01); *B60G 11/27* (2013.01); *B60G 11/28* (2013.01); *B60G 13/10* (2013.01); *F16F 9/049* (2013.01); *F16F 9/0472* (2013.01); *F16F 9/05* (2013.01); *B60G 2202/152* (2013.01); *B60G 2202/242* (2013.01); *B60G 2202/30* (2013.01); *B60G 2206/424* (2013.01); *B60G 2300/026* (2013.01)

(58) Field of Classification Search
CPC .......... F16F 9/0472; F16F 9/049; F16F 9/057; B60G 11/27
See application file for complete search history.

(56) References Cited

U.S. PATENT DOCUMENTS 2,773,686 A     12/1956  Nash
2,926,011 A  *  2/1960  Slemmons ............. B60G 11/27
                                                              267/64.27

(Continued)

FOREIGN PATENT DOCUMENTS

DE      19720776 A1   11/1998
EP       0166702 A2    1/1986
(Continued)

*Primary Examiner* — Bradley T King
(74) *Attorney, Agent, or Firm* — Dureska & Moore, LLC; David P. Dureska; Brent L. Moore

(57) ABSTRACT

An air spring with damping characteristics for a suspension assembly of a heavy-duty vehicle includes a first chamber, a second chamber and an intermediate chamber. The intermediate chamber is operatively connected between the first chamber and the second chamber. A first means provides restricted fluid communication between the intermediate chamber and the first chamber. A second means provides restricted fluid communication between the intermediate chamber and the second chamber. The first and second means for providing restricted fluid communication between the intermediate chamber and the first and second chambers, respectively, provide damping characteristics to the air spring during operation of the heavy-duty vehicle.

17 Claims, 8 Drawing Sheets

(56) References Cited

U.S. PATENT DOCUMENTS

| | | | |
|---|---|---|---|
| 2,984,476 A | 5/1961 | Turner | |
| 3,212,769 A | 10/1965 | Ishibashi et al. | |
| 3,218,055 A * | 11/1965 | Nallinger | B60G 11/30 267/64.16 |
| 4,934,667 A | 6/1990 | Pees et al. | |
| 5,049,318 A * | 9/1991 | Guntly | F02B 63/02 261/34.1 |
| 5,234,203 A | 8/1993 | Smith | |
| 5,374,077 A * | 12/1994 | Penzotti | B60G 11/30 267/123 |
| 5,954,316 A | 9/1999 | Voss | |
| 6,386,524 B1 | 5/2002 | Levy et al. | |
| 6,644,632 B1 * | 11/2003 | Jaberg | B60G 11/28 267/64.21 |
| 8,540,222 B2 | 9/2013 | Westnedge et al. | |
| 8,844,956 B2 | 9/2014 | Boler et al. | |
| 9,079,469 B2 | 7/2015 | Dehmel et al. | |
| 9,157,529 B2 | 10/2015 | Westnedge et al. | |
| 9,261,157 B2 * | 2/2016 | Leonard | B60G 11/27 |
| 9,709,122 B2 * | 7/2017 | Zec | F16F 9/057 |
| 2004/0084858 A1 | 5/2004 | Svartz et al. | |
| 2008/0284072 A1 * | 11/2008 | Hayes | B60G 11/27 267/119 |
| 2009/0051165 A1 * | 2/2009 | Frost | F16L 13/147 285/334.5 |
| 2010/0096786 A1 | 4/2010 | Orlamunder et al. | |
| 2011/0049774 A1 | 3/2011 | Naber | |
| 2011/0115140 A1 | 5/2011 | Moulik et al. | |
| 2012/0061887 A1 | 3/2012 | Westnedge et al. | |
| 2012/0291626 A1 * | 11/2012 | Westnedge | B60G 9/003 92/181 R |
| 2014/0054833 A1 * | 2/2014 | Neitzel | B60G 11/27 267/64.27 |
| 2014/0167337 A1 | 6/2014 | Ramsey et al. | |
| 2014/0300075 A1 * | 10/2014 | Delorenzis | B60G 11/30 280/124.159 |
| 2014/0300076 A1 | 10/2014 | Fulton et al. | |
| 2016/0236532 A1 * | 8/2016 | Moulik | F16F 9/05 |
| 2016/0280033 A1 | 9/2016 | Fulton et al. | |
| 2016/0298712 A1 * | 10/2016 | Weber | F16F 9/049 |
| 2016/0332497 A1 | 11/2016 | Keeler et al. | |

FOREIGN PATENT DOCUMENTS

| | | |
|---|---|---|
| WO | 2001061207 A1 | 8/2001 |
| WO | 2013181241 A1 | 12/2013 |
| WO | 2014093605 A1 | 6/2014 |

\* cited by examiner

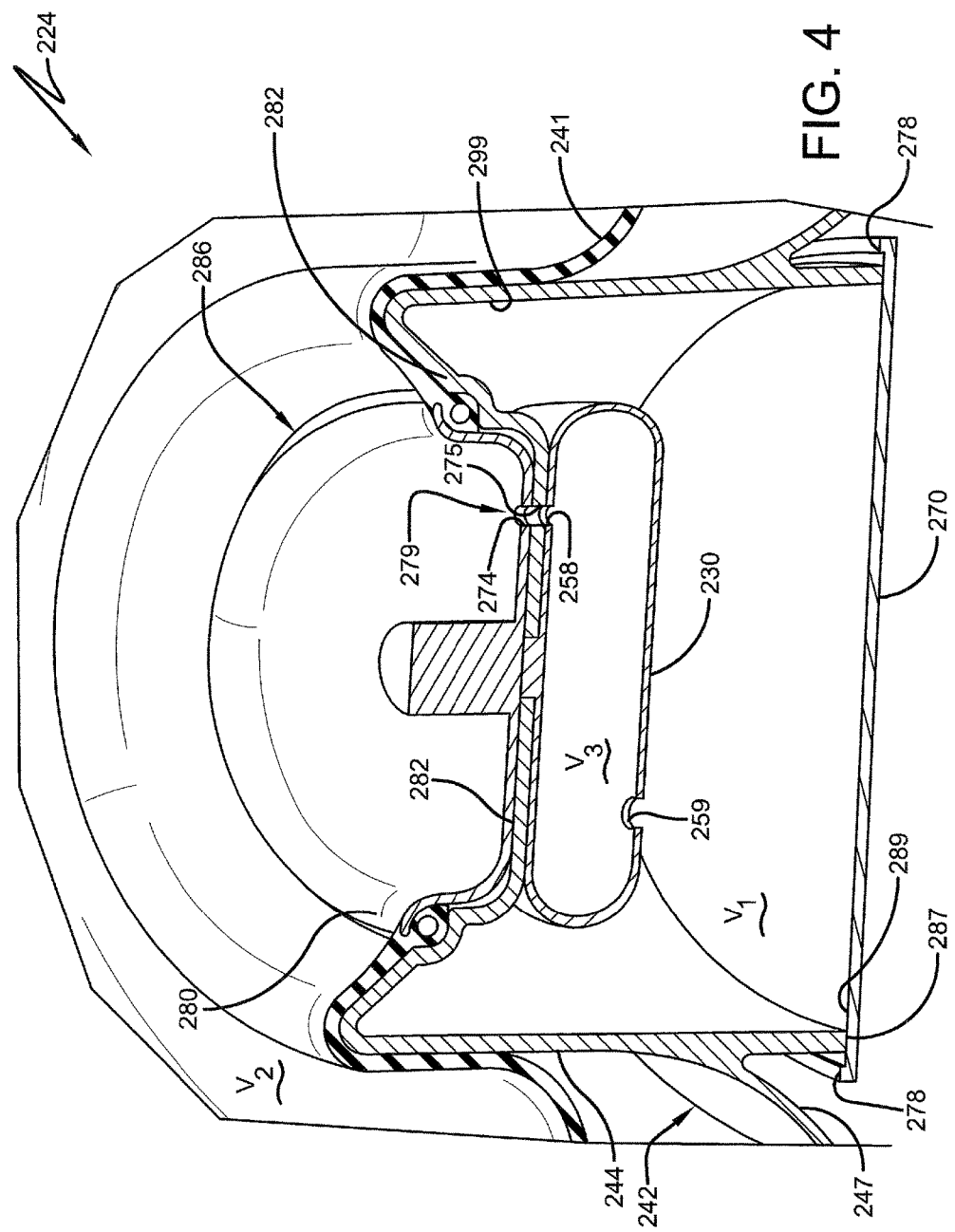

DAMPING AIR SPRING WITH STAGED OPENINGS

CROSS-REFERENCE TO RELATED APPLICATION

This application claims the benefit of U.S. Provisional Patent Application Ser. No. 62/261,554, filed Dec. 1, 2015.

BACKGROUND OF THE INVENTION

Field of the Invention

The invention relates generally to the art of axle/suspension systems for heavy-duty vehicles. More particularly, the invention relates to axle/suspension systems for heavy-duty vehicles which utilize an air spring to cushion the ride of the vehicle. More specifically, the invention is directed to an air spring with damping characteristics for a heavy-duty vehicle axle/suspension system, whereby the air spring utilizes multiple chambers connected via staged openings that provide better airflow control and promote damping of the axle/suspension system over a broader range of loads, wheel motions and frequencies utilizing a generally reduced air volume in order to improve ride quality for the heavy-duty vehicle during operation.

Background Art

The use of air-ride trailing and leading arm rigid beam-type axle/suspension systems has been very popular in the heavy-duty truck and tractor-trailer industry for many years. Although such axle/suspension systems are found in widely varying structural forms, in general their structure is similar in that each system typically includes a pair of suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to main members, with the understanding that such reference is by way of example, and that the present invention applies to heavy-duty vehicle axle/suspension systems suspended from main members of: primary frames, movable subframes and non-movable subframes.

Specifically, each suspension assembly of an axle/suspension system includes a longitudinally extending elongated beam. Each beam typically is located adjacent to and below a respective one of a pair of spaced-apart longitudinally extending main members and one or more cross members, which form the frame of the vehicle. More specifically, each beam is pivotally connected at one of its ends to a hanger, which in turn is attached to and depends from a respective one of the main members of the vehicle. An axle extends transversely between and typically is connected by some means to the beams of the pair of suspension assemblies at a selected location from about the mid-point of each beam to the end of the beam opposite from its pivotal connection end. The beam end opposite the pivotal connection end also is connected to an air spring, or other spring mechanism, which in turn is connected to a respective one of the main members. A height control valve is mounted on the main member or other support structure and is operatively connected to the beam and to the air spring in order to maintain the ride height of the vehicle. A brake system and, optionally, one or more shock absorbers for providing damping to the axle/suspension system of the vehicle also are mounted on the axle/suspension system. The beam may extend rearwardly or frontwardly from the pivotal connection relative to the front end of the vehicle, thus defining what are typically referred to as trailing arm or leading arm axle/suspension systems, respectively. However, for purposes of the description contained herein, it is understood that the term "trailing arm" will encompass beams which extend either rearwardly or frontwardly with respect to the front end of the vehicle.

The axle/suspension systems of the heavy-duty vehicle act to cushion the ride, dampen vibrations and stabilize the vehicle. More particularly, as the vehicle is traveling over the road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental effect of these forces on the vehicle as it is operating, the axle/suspension system is designed to react and/or absorb at least some of them.

These forces include vertical forces caused by vertical movement of the wheels as they encounter certain road conditions, fore-aft forces caused by acceleration and deceleration of the vehicle as well as certain road conditions, and side-load and torsional forces associated with transverse vehicle movement, such as turning of the vehicle and lane-change maneuvers. In order to address such disparate forces, axle/suspension systems have differing structural requirements. More particularly, it is desirable for an axle/suspension system to have beams that are fairly stiff in order to minimize the amount of sway experienced by the vehicle and thus provide what is known in the art as roll stability. However, it is also desirable for an axle/suspension system to be relatively flexible to assist in cushioning the vehicle from vertical impacts, and to provide compliance so that the components of the axle/suspension system resist failure, thereby increasing durability of the axle/suspension system. It is also desirable to dampen the vibrations or oscillations that result from such forces. A key component of the axle/suspension system that cushions the ride of the vehicle from vertical impacts is the air spring. In the past, a shock absorber was utilized on the axle/suspension system to provide damping characteristics to the axle/suspension system. More recently, air springs with damping characteristics have been developed that eliminate the shock absorber, and the air spring provides damping to the axle/suspension system. One such air spring with damping characteristics is shown and described in U.S. Pat. No. 8,540,222, owned by the assignee of the instant application, Hendrickson USA, L.L.C.

A conventional air spring without damping characteristics which is utilized in heavy-duty air-ride axle/suspension systems includes three main components: a flexible bellows, a piston and a bellows top plate. The bellows is typically formed from rubber or other flexible material, and is operatively mounted on top of the piston. The piston is typically formed from steel, aluminum, fiber reinforced plastics or other rigid material, and is mounted on the rear end of the top plate of the beam of the suspension assembly by fasteners of the type that are generally well known in the art. The volume of pressurized air, or "air volume", that is contained within the air spring is a major factor in determining the spring rate of the air spring. More specifically, this air volume is contained within the bellows and, in some cases, the piston of the air spring. The larger the air volume of the air spring, the lower the spring rate of the air spring. A lower spring rate is generally more desirable in the heavy-duty vehicle industry because it provides a softer ride to the vehicle during operation.

Prior art air springs without damping characteristics, while providing cushioning to the vehicle cargo and occupant(s) during operation of the vehicle, provide little, if any, damping characteristics to the axle/suspension system. Such damping characteristics are instead typically provided by a pair of hydraulic shock absorbers, although a single shock absorber has also been utilized and is generally well known in the art. Each one of the shock absorbers is mounted on and extends between the beam of a respective one of the suspension assemblies of the axle/suspension system and a respective one of the main members of the vehicle. These shock absorbers add complexity and weight to the axle/suspension system. Moreover, because the shock absorbers are a service item of the axle/suspension system that will require maintenance and/or replacement from time to time, they also add additional maintenance and/or replacement costs to the axle/suspension system.

The amount of cargo that a vehicle may carry is governed by local, state, and/or national road and bridge laws. The basic principle behind most road and bridge laws is to limit the maximum load that a vehicle may carry, as well as to limit the maximum load that can be supported by individual axles. Because shock absorbers are relatively heavy, these components add undesirable weight to the axle/suspension system and therefore reduce the amount of cargo that can be carried by the heavy-duty vehicle. Depending on the shock absorbers employed, they also add varying degrees of complexity to the axle/suspension system, which is also undesirable.

An air spring with damping characteristics, such as the one shown and described in U.S. Pat. No. 8,540,222, owned by the assignee of the instant application, Hendrickson USA, L.L.C., includes a piston having a hollow cavity which is in fluid communication with the bellows via at least one opening, which provides restricted communication of air between the piston and the bellows volumes during operation of the axle/suspension system. The air volume of the air spring is in fluid communication with the height control valve of the vehicle, which in turn is in fluid communication with an air source, such as an air supply tank. The height control valve, by directing air flow into and out of the air spring of the axle/suspension system, helps maintain the desired ride height of the vehicle.

The restricted communication of air between the piston chamber and the bellows chamber during operation provides damping to the axle/suspension system. More specifically, when the axle/suspension system experiences a jounce event, such as when the vehicle wheels encounter a curb or a raised bump in the road, the axle moves vertically upwardly toward the vehicle chassis. In such a jounce event, the bellows is compressed by the axle/suspension system as the wheels of the vehicle travel over the curb or the raised bump in the road. The compression of the air spring bellows causes the internal pressure of the bellows to increase. Therefore, a pressure differential is created between the bellows and the piston chamber. This pressure differential causes air to flow from the bellows through the opening(s) into the piston chamber. Air will continue to flow back and forth through the opening(s) between the bellows and the piston chambers until the pressures of the piston chamber and the bellows chamber have equalized. The restricted flow of air back and forth through the opening(s) causes damping to occur.

Conversely, when the axle/suspension system experiences a rebound event, such as when the vehicle wheels encounter a large hole or depression in the road, the axle moves vertically downwardly away from the vehicle chassis. In such a rebound event, the bellows is expanded by the axle/suspension system as the wheels of the vehicle travel into the hole or depression in the road. The expansion of the air spring bellows causes the internal pressure of the bellows to decrease. As a result, a pressure differential is created between the bellows and the piston chamber. This pressure differential causes air to flow from the piston chamber through the opening(s) into the bellows chamber. Air will continue to flow back and forth through the opening(s) between the bellows and the piston chambers until the pressures of the piston chamber and the bellows chamber have equalized. The restricted flow of air back and forth through the opening(s) causes damping to occur.

Prior art air springs having damping characteristics have certain limitations due to their structural make-up. First, because the prior art air springs only include openings located between the bellows chamber and the piston chamber, the damping range of the air spring is typically limited to a particular load or wheel motion. These limitations on the damping range of the air spring limit the ability to "tune" the damping for a given application. Therefore, it is desirable to have an air spring with damping features that makes it possible to have a broader damping range over a broader range of loads and wheel motions, thereby expanding the operating range of the damping air spring.

Second, prior art air springs with damping characteristics typically provide maximum damping that is frequency dependent. This means that the maximum damping provided by the air spring at a frequency of 1 Hz can be greatly reduced at a frequency of 10 Hz. Therefore, it is desirable to have an air spring with damping features that reduces or eliminates frequency dependence.

Third, prior art air springs with damping characteristics typically require a large air volume. This large air volume requirement in turn increases the amount of space required by the axle/suspension system, which typically is not desirable in the heavy-duty vehicle industry, because increasing the amount of space required by the axle/suspension system increases weight and reduces the room allowed for payload, the result being that less payload can be carried by the vehicle. Therefore, it is desirable to have an air spring with damping features that makes it possible to reduce the need for larger air volumes to increase damping. This, in turn, enables use of a smaller air spring and reduces the amount of space required by the axle/suspension system, which allows more room and weight for payload or cargo.

The air spring with damping characteristics for heavy-duty vehicles of the present invention overcomes the problems associated with the prior art air springs with and without damping features, by providing an intermediate chamber with staged openings in fluid communication with the bellows chamber and the piston chamber that exhibits better airflow control, resulting in optimization of the damping characteristics of the air spring. By providing an air spring for heavy-duty vehicles having optimized damping characteristics, the shock absorber of the axle/suspension system can be eliminated or its size reduced, reducing complexity, saving weight and cost, and allowing the heavy-duty vehicle to haul more cargo. Moreover, elimination of the shock absorbers potentially eliminates costly repairs and/or maintenance costs associated with these systems.

The air spring with damping characteristics for heavy-duty vehicles of the present invention provides damping features to the axle/suspension system over a broader damping range to accommodate a broader range of loads and wheel motions, thereby reducing the constraints on the operating range of the damping air spring. In addition, the air spring with damping characteristics for heavy-duty vehicles of the present invention reduces or eliminates frequency dependence. Moreover, the air spring with damping characteristics for heavy-duty vehicles of the present invention makes it possible to reduce the need for larger air volumes to increase damping features, which in turn enables use of a smaller air sprig and reduces the amount of space required by the axle/suspension system and thus allows more room and weight for payload or cargo.

SUMMARY OF THE INVENTION

An objective of the damping air spring with staged openings of the present invention includes providing an air spring with damping characteristics for heavy-duty vehicles that provides damping features to the axle/suspension system over a broader damping range to accommodate a broader range of loads and wheel motions, thereby reducing the constraints on the operating range of the damping air spring.

A further objective of the damping air spring with staged openings of the present invention is to provide an air spring with damping characteristics for heavy-duty vehicles that reduces or eliminates frequency dependence.

Still another objective of the damping air spring with staged openings of the present invention is to provide an air spring with damping characteristics for heavy-duty vehicles that provides better air flow control between multiple chambers of the axle/suspension system.

Yet another objective of the damping air spring with staged openings of the present invention is to provide an air spring with damping characteristics for heavy-duty vehicles that makes it possible to reduce the need for larger air volumes to increase damping features, which in turn reduces the amount of space for air springs required by the axle/suspension system and thus allows more room and weight for payload or cargo.

These objectives and advantages are obtained by the air spring with damping characteristics for a suspension assembly of a heavy-duty vehicle of the present invention, which includes a first chamber; a second chamber; an intermediate chamber operatively connected to the first chamber and to the second chamber; a first means for providing restricted fluid communication between the intermediate chamber and the first chamber; and a second means for providing restricted fluid communication between the intermediate chamber and the second chamber, wherein the first and second means for providing restricted fluid communication provide damping characteristics to the air spring.

BRIEF DESCRIPTION OF THE SEVERAL VIEWS OF THE DRAWINGS

The preferred embodiments of the present invention, illustrative of the best modes in which applicants have contemplated applying the principles, are set forth in the following description and are shown in the drawings, and are particularly and distinctly pointed out and set forth in the appended claims.

FIG. 4 is a greatly enlarged fragmentary perspective view in section of a portion of the air spring shown in FIG. 3A, showing the intermediate chamber top wall opening, the piston top plate opening and the retaining plate opening, with their respective openings being aligned to form the continuous opening between the intermediate chamber and the bellows chamber, to allow fluid communication between the intermediate chamber and the bellows chamber, and also showing the intermediate chamber bottom wall opening formed through the bottom wall of the intermediate chamber to allow fluid communication between the intermediate chamber and the piston chamber;

Similar numerals refer to similar parts throughout the drawings.

DESCRIPTION OF THE PREFERRED EMBODIMENT

Figure 1:
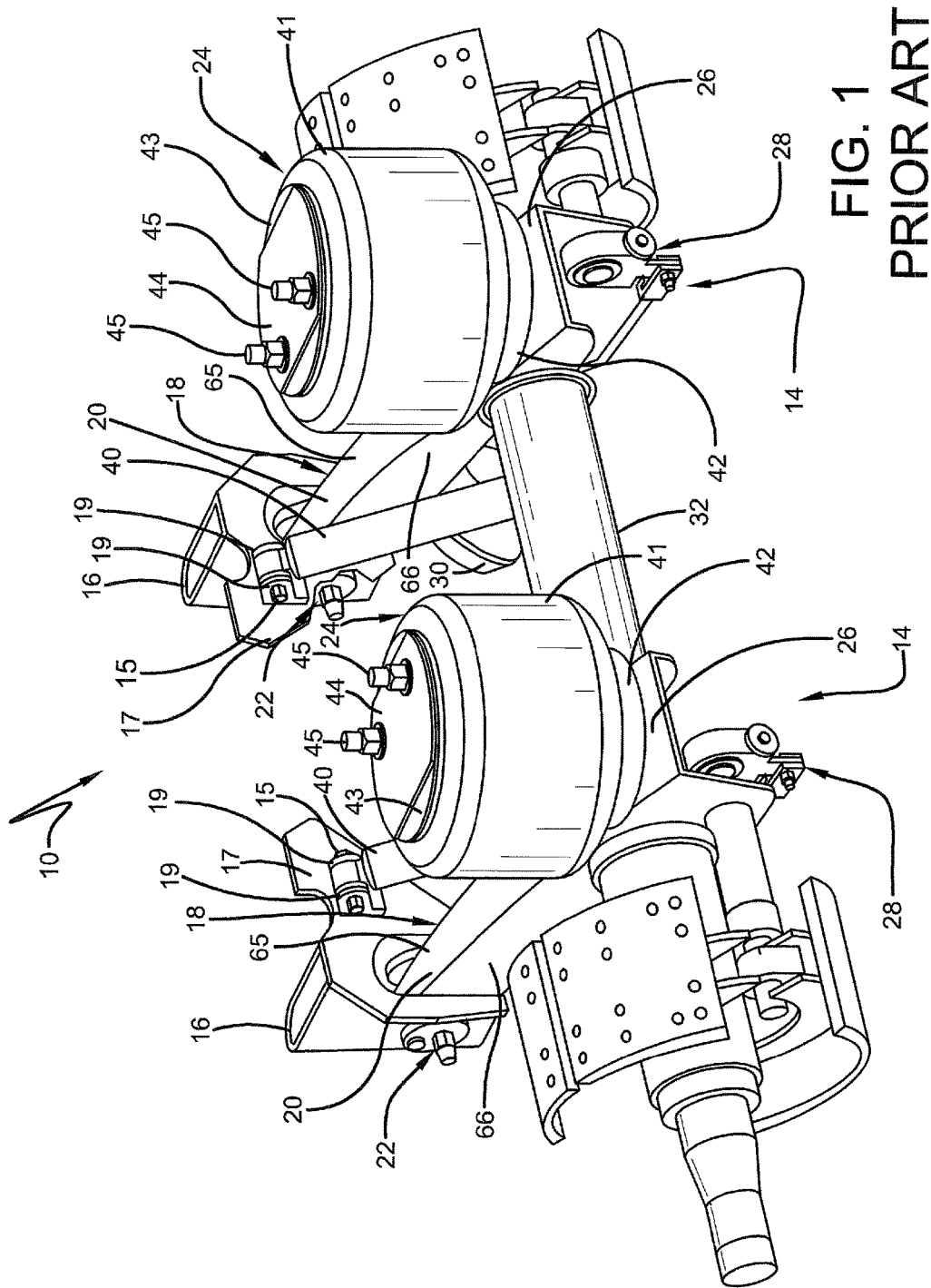
FIG. 1 is a top rear driver side perspective view of an axle/suspension system incorporating a pair of prior art non-damping air springs, and showing a pair of shock absorbers, with each one of the pair of shock absorbers mounted on a respective one of the suspension assemblies of the axle/suspension system.

In order to better understand the environment in which the air spring with damping characteristics for a heavy-duty vehicle of the present invention is utilized, a trailing arm overslung beam-type air-ride axle/suspension system that incorporates a pair of prior art air springs 24 without damping characteristics, is indicated generally at 10, is shown in FIG. 1, and now will be described in detail below.

It should be noted that axle/suspension system 10 is typically mounted on a pair of longitudinally-extending spaced-apart main members (not shown) of a heavy-duty vehicle, which is generally representative of various types of frames used for heavy-duty vehicles, including primary frames that do not support a subframe and primary frames and/or floor structures that do support a subframe. For primary frames and/or floor structures that do support a subframe, the subframe can be non-movable or movable, the latter being commonly referred to as a slider box. Because axle/suspension system 10 generally includes an identical pair of suspension assemblies 14, for sake of clarity only one of the suspension assemblies will be described below.

Suspension assembly 14 is pivotally connected to a hanger 16 via a trailing arm overslung beam 18. More specifically, beam 18 is formed having a generally upside-down integrally formed U-shape with a pair of sidewalls 66 and a top plate 65, with the open portion of the beam facing generally downwardly. A bottom plate (not shown) extends between and is attached to the lowermost ends of sidewalls 66 by any suitable means such as welding to complete the structure of beam 18. Trailing arm overslung beam 18 includes a front end 20 having a bushing assembly 22, which includes a bushing, pivot bolts and washers as are well known in the art, to facilitate pivotal connection of the beam to hanger 16. Beam 18 also includes a rear end 26, which is welded or otherwise rigidly attached to a transversely extending axle 32.

Suspension assembly 14 also includes air spring 24, mounted on and extending between beam rear end 26 and the main member (not shown). Air spring 24 includes a bellows 41 and a piston 42. The top portion of bellows 41 is sealingly engaged with a bellows top plate 43. With continued reference to FIG. 1, an air spring mounting plate 44 is mounted on top plate 43 by fasteners 45, which are also used to mount the top portion of air spring 24 to the vehicle main member (not shown). Piston 42 is generally cylindrical-shaped and has a generally flat bottom plate and top plate (not shown). The bottom portion of the bellows 41 is sealingly engaged with the piston top plate (not shown). The piston bottom plate rests on beam top plate 65 at beam rear end 26 and is attached thereto in a manner well known to those having skill in the art, such as by fasteners or bolts (not shown). The piston top plate is formed without openings so that there is no fluid communication between piston 42 and bellows 41. As a result, piston 42 does not generally contribute any appreciable volume to air spring 24. The top end of a shock absorber 40 is mounted on an inboardly extending wing 17 of hanger 16 via a mounting bracket 19 and a fastener 15, in a manner well known in the art. The bottom end of shock absorber 40 is mounted to beam 18 (the mount not shown) in a manner well known to those having skill in the art. For the sake of relative completeness, a brake system 28 including a brake chamber 30 is shown mounted on prior art suspension assembly 14.

As mentioned above, axle/suspension system 10 is designed to absorb forces that act on the vehicle as it is operating. More particularly, it is desirable for axle/suspension system 10 to be rigid or stiff in order to resist roll forces and thus provide roll stability for the vehicle. This is typically accomplished by using beam 18, which is rigid, and also is rigidly attached to axle 32. It is also desirable, however, for axle/suspension system 10 to be flexible to assist in cushioning the vehicle (not shown) from vertical impacts and to provide compliance so that the axle/suspension system resists failure. Such flexibility typically is achieved through the pivotal connection of beam 18 to hanger 16 with bushing assembly 22. Air spring 24 cushions the ride for cargo and passengers while shock absorber 40 controls the ride for cargo and passengers.

Prior art air spring 24 described above, has very limited or no damping capabilities because its structure, as described above, does not provide for the same. Instead, prior art air spring 24 relies on shock absorber 40 to provide damping to axle/suspension system 10. Because shock absorber 40 is relatively heavy, this adds weight to axle/suspension system 10 and therefore reduces the amount of cargo that can be carried by the heavy-duty vehicle. Shock absorbers 40 also add complexity to axle/suspension system 10. Moreover, because shock absorbers 40 are a service item of axle/suspension system 10 that will require maintenance and/or replacement from time to time, they also add additional maintenance and/or replacement costs to the axle/suspension system.

Figure 2:
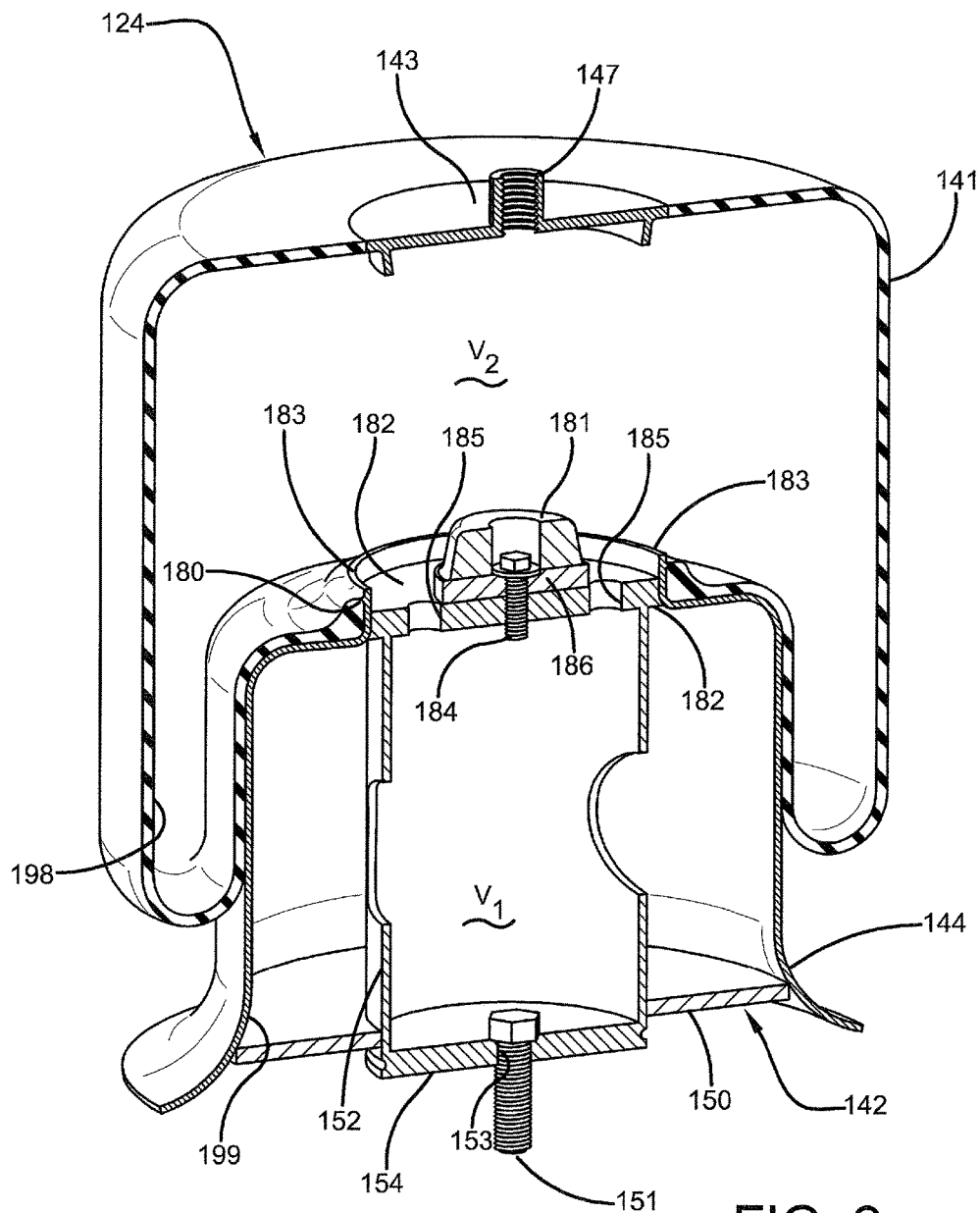
FIG. 2 is a perspective view, in section, of a prior art air spring with damping characteristics, showing the bellows chamber connected to the piston chamber via a pair of openings.

A prior art air spring with damping features is shown in FIG. 2 at reference numeral 124. Like prior art air spring 24, prior art air spring 124 is incorporated into an axle/suspension system similar to axle/suspension system 10, or other similar air-ride axle/suspension system, but without shock absorbers. Air spring 124 includes a bellows 141 and a piston 142. The top end of bellows 141 is sealingly engaged with a bellows top plate 143 in a manner well known in the art. An air spring mounting plate (not shown) is mounted on the top surface of top plate 143 by a fastener 147 which is also used to mount the top portion of air spring 124 to a respective one of the main members (not shown) of the vehicle. Alternatively, bellows top plate 143 could also be mounted directly on a respective one of the main members (not shown) of the vehicle. Piston 142 is generally cylindrical-shaped and includes a continuous generally stepped sidewall 144 attached to a generally flat bottom plate 150, and includes a top plate 182. Bottom plate 150 is formed with an upwardly extending central hub 152. Central hub 152 includes a bottom plate 154 formed with a central opening 153. A fastener 151 is disposed through opening 153 in order to attach piston 142 to the beam top plate (not shown) at beam rear end (not shown).

Top plate 182, sidewall 144 and bottom plate 150 of piston 142 define a piston chamber 199 having an interior volume $V_1$. Top plate 182 of piston 142 is formed with a circular upwardly extending protrusion 183 having a lip 180 around its circumference. Lip 180 cooperates with the lowermost end of bellows 141 to form an airtight seal between the bellows and the lip, as is well known to those of ordinary skill in the art. Bellows 141, top plate 143 and piston top plate 182 define a bellows chamber 198 having an interior volume $V_2$ at standard static ride height. A bumper 181 is rigidly attached to a bumper mounting plate 186 by means generally well known in the art. Bumper mounting plate 186 is in turn mounted on piston top plate 182 by a fastener 184. Bumper 181 extends upwardly from the top surface of bumper mounting plate 186. Bumper 181 serves as a cushion between piston top plate 182 and bellows top plate 143 in order to keep the plates from contacting one another during operation of the vehicle, which can potentially cause damage to the plates and air spring 124.

Piston top plate 182 is formed with a pair of openings 185, which allow volume $V_1$ of piston chamber 199 and volume $V_2$ of bellows chamber 198 to communicate with one another. More particularly, openings 185 allow fluid or air to pass between piston chamber 199 and bellows chamber 198 during operating of the vehicle. Openings 185 are circular shaped.

The ratio of the cross-sectional area of openings 185 measured in in.$^2$ to the volume of piston chamber 199 measured in in.$^3$ to the volume of bellows chamber 198 is in the range of ratios of from about 1:600:1200 to about 1:14100:23500.

By way of example, air spring 124 for axle/suspension system 10 for a heavy-duty trailer having an axle GAWR of about 20,000 lbs., utilizes bellows chamber 198 having volume $V_2$ equal to about 485 in.$^3$, piston chamber 199 having volume $V_1$ of about 240 in.$^3$, and openings 185 having a combined cross-sectional area of about 0.06 in.$^2$.

Having now described the structure of air spring 124, the operation of the damping characteristics of the air spring will be described in detail below. When axle 32 of axle/suspension system 10 experiences a jounce event, such as when the vehicle wheels encounters a curb or a raised bump in the road, the axle moves vertically upwardly toward the vehicle chassis. In such a jounce event, bellows chamber 198 is compressed by axle/suspension system 10 as the wheels of the vehicle travel over the curb or the raised bump in the road. The compression of air spring bellows chamber 198 causes the internal pressure of the bellows chamber to increase. As a result, a pressure differential is created between bellows chamber 198 and piston chamber 199. This pressure differential causes air to flow from bellows chamber 198, through piston top plate openings 185 and into piston chamber 199. The restricted flow of air between bellows chamber 198 into piston chamber 199 through piston top plate openings 185 causes damping to occur. As an additional result of the airflow through openings 185, the pressure differential between bellows chamber 198 and piston chamber 199 is reduced. Air continues to flow through piston top plate openings 185 until the pressures of piston chamber 199 and bellows chamber 198 have equalized.

Conversely, when axle 32 of axle/suspension system 10 experiences a rebound event, such as when the vehicle wheels encounter a large hole or depression in the road, the axle moves vertically downwardly away from the vehicle chassis. In such a rebound event, bellows chamber 198 is expanded by axle/suspension system 10 as the wheels of the vehicle travel into the hole or depression in the road. The expansion of air spring bellows 198 causes the internal pressure of the bellows chamber to decrease. As a result, a pressure differential is created between bellows chamber 198 and piston chamber 199, through piston top plate openings 185, and into bellows chamber 198. The restricted flow of air through piston top plate openings 185 causes damping to occur. As an additional result of the airflow through openings 185, the pressure differential between the bellows chamber 198 and piston chamber 199 is reduced. Air will continue to flow through the piston top plate openings 185 until the pressure of piston chamber 199 and bellows chamber 198 have equalized. When little or no suspension movement has occurred over a period of several seconds the pressure of bellows chamber 198 and piston chamber 199 can be considered equal.

As described above, volume $V_1$ of piston chamber 199, volume $V_2$ of bellows chamber 198, along with the cross-sectional area of openings 185, all in relation to one another, provide application-specific damping characteristics, at standard temperature and pressure, to air spring 124 during operation of the vehicle.

Prior art air spring 124 with damping characteristics has certain constraints due to its structural make-up. First, because prior art air spring 124 only includes restricted airflow openings located directly between the bellows chamber and the piston chamber, the damping range of the air spring is typically limited to a particular load or wheel motion. Such constraints on the damping range of prior art air spring 124 limit the ability to "tune" the damping for a given application. Second, prior art air spring 124 with damping characteristics typically provides maximum damping that is frequency dependent. This means that the maximum damping provided by air spring 124 at a frequency of 1 Hz is greatly reduced at a frequency of 10 Hz. Third, prior art air spring 124 with damping features typically requires a relatively large air volume. This large air volume requirement in turn increases the amount of space need for incorporating air spring 124 into the axle/suspension system, which typically is not desirable in the heavy-duty vehicle industry, because increasing the amount of space required for air springs by the axle/suspension system increases weight and reduces the room allowed for payload, with the result being that less payload can be carried by the vehicle.

The air spring with damping characteristics of the present invention overcomes the deficiencies of prior art damping and non-damping air springs 24,124 described above, and will now be described in detail below.

Figure 3:
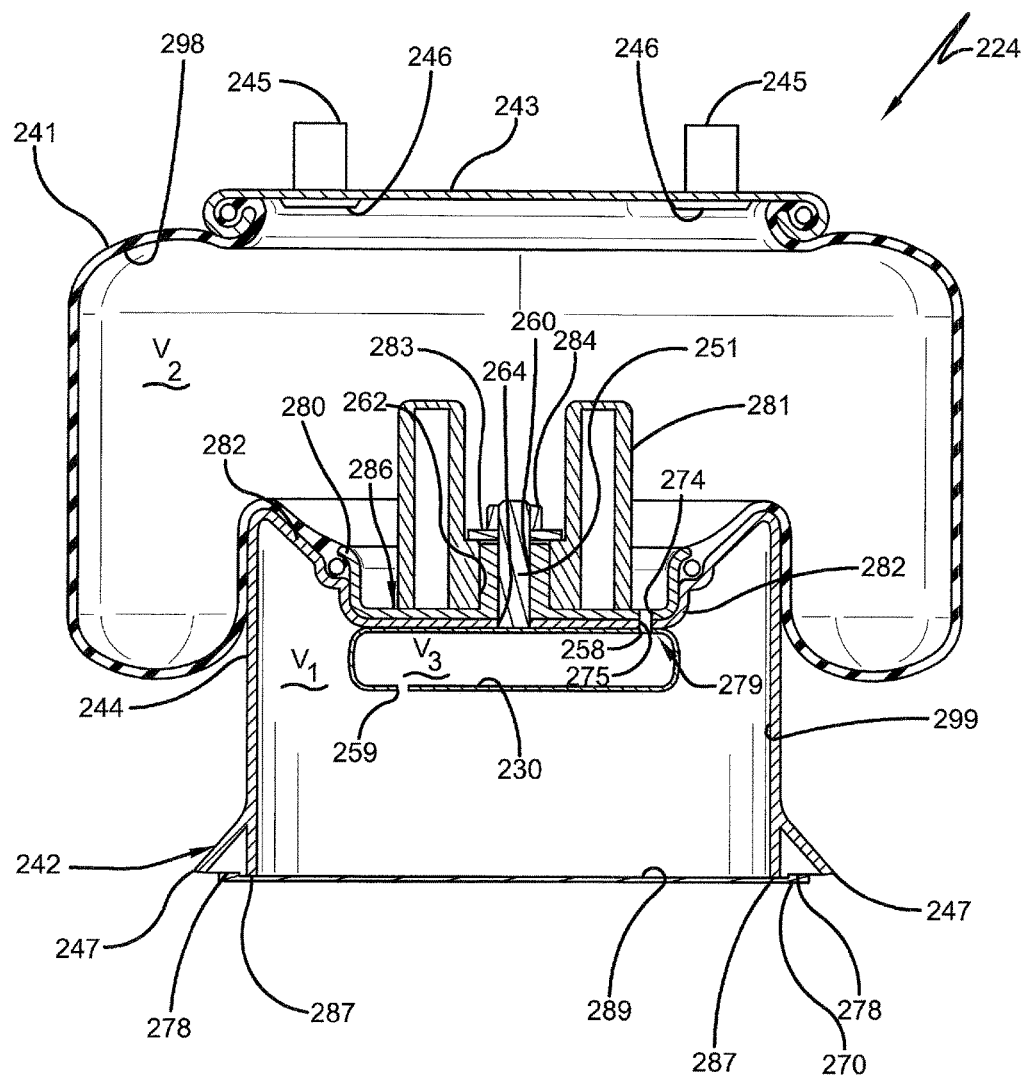
FIG. 3 is an elevational view in section of a first exemplary embodiment air spring with damping characteristics of the present invention, showing the intermediate chamber disposed within the piston of the air spring, the intermediate chamber being in fluid communication with the bellows chamber via a continuous opening formed through the intermediate chamber top wall, the piston top plate and the retaining plate, and showing the intermediate chamber also being in fluid communication with the piston chamber of the air spring via an intermediate chamber bottom wall opening.
Figure 3A:
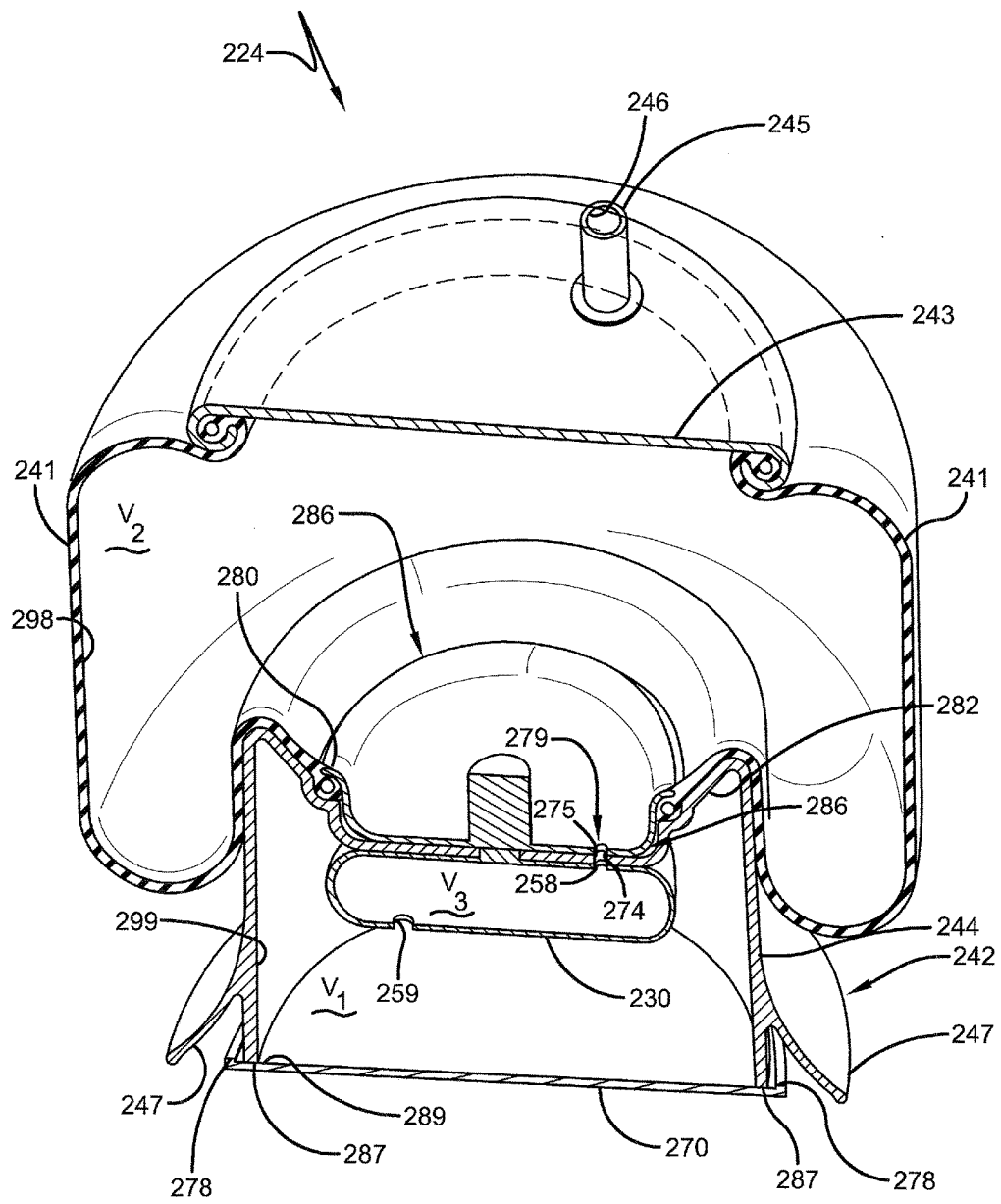
FIG. 3A is a top perspective view in section of the first exemplary embodiment air spring with damping characteristics of the present invention shown in FIG. 3, with the bumper and fastener removed.

Turning now to FIGS. 3, 3A and 4, a first exemplary embodiment air spring with damping characteristics of the present invention is shown at reference numeral 224. Like prior art air springs 24 and 124, air spring 224 of the present invention is incorporated into an axle/suspension system having a structure similar to axle/suspension system 10, or other similar air-ride axle/suspension system, but without shock absorbers. Air spring 224 includes a bellows 241, a bellows top plate 243, and a piston 242. Top plate 243 includes a pair of fasteners 245, each formed with an opening 246. Fasteners 245 are utilized to mount air spring 224 to an air spring mounting plate (not shown), that in turn is mounted to the main member of the vehicle (not shown). Piston 242 is generally cylindrical-shaped and includes a sidewall 244, a flared portion 247, and a top plate 282.

With particular reference to FIG. 3, a bumper 281 is disposed on a top surface of a retaining plate 286. Retaining plate 286, bumper 281 and piston top plate 282 are each formed with an opening 260, 262, and 264, respectively. A fastener 251 is disposed through piston top plate opening 264, retaining plate opening 260, and bumper opening 262. A washer 283 and a nut 284 are disposed on fastener 251 to mount bumper 281 and retaining plate 286 on the top surface of piston top plate 282. Retaining plate 286 includes a flared end 280 that is molded into the lower end of bellows 241, which holds the bellows in place on piston 242 and forms an airtight seal between the bellows and the piston. It should be understood that flared end 280 of retaining plate 286 could also be separate from the lower end of bellows 241, whereby the flared end would capture and hold the lower end of the bellows in place on piston 242 to form an airtight seal between the bellows and the piston, without changing the overall concept or operation of the present invention. Bellows 241, retaining plate 286, and bellows top plate 243 generally define a bellows chamber 298 having an interior volume $V_2$ at standard ride height. Bellows chamber 298 preferably has a volume of from about 305 in.$^3$ to about 915 in.$^3$. More preferably, bellows chamber 298 has a volume of about 485 in.$^3$. Bumper 281 is formed from rubber, plastic or other compliant material and extends generally upwardly from retaining plate 286 mounted on piston top plate 282.

Bumper 281 serves as a cushion between piston top plate 282 and the underside of bellows top plate 243 in order to prevent the plates from contacting one another and causing damage during operation of the vehicle.

A generally circular disc 270 is attached or mated to the bottom of piston 242 of first exemplary embodiment air spring 224 of the present invention. Circular disc 270 is formed with an opening (not shown) for fastening piston 242 to beam rear end top plate 65 (FIG. 1), directly or utilizing a beam mounting pedestal (not shown) in order to attach piston 242 of air spring 224 to beam 18 (FIG. 1). Once attached, a top surface 289 of circular disc 270 is mated to a lower surface 287 of sidewall 244 of piston 242 of first exemplary embodiment air spring 224 to provide an airtight seal between disc 270 and piston 242. Circular disc 270 is formed with a continuously raised lip 278 on top surface 289 along the periphery of circular disc 270, with the lip being disposed generally between flared portion 247 and sidewall 244 of piston 242 when disc 270 is mated to the piston. Optionally, the attachment of disc 270 to piston 242 may be supplemented by additional attachment means such as welding, soldering, crimping, friction welding, an O-ring, a gasket, adhesive or the like. Alternatively, the attachment of disc 270 to piston 242 may be accomplished via other means such as fasteners, welding, soldering, crimping, friction welding, adhesives and the like, without changing the overall concept or operation of the present invention. Circular disc 270 may be composed of metal, plastic, and/or composite material, or other materials known to those skilled in the art, without changing the overall concept or operation of the present invention. Disc 270 may optionally include a groove (not shown) formed in top surface 289 disposed circumferentially around the disc, and configured to mate with a downwardly extending hub of the piston in order to reinforce the connection of the disc to the bottom of piston 242. An O-ring or gasket material could optionally be disposed in the groove to ensure an airtight fit of disc 270 to piston 242. Once disc 270 is attached to piston 242, top plate 282, sidewall 244, and the disc, define a piston chamber 299 having an interior volume $V_1$. Piston chamber 299 is generally able to withstand the required burst pressure of the axle/suspension system 10 during vehicle operation. Piston chamber 299 preferably has a volume of from about 150 in.$^3$ to about 550 in.$^3$. More preferably, piston chamber 299 has a volume of about 240 in.$^3$.

In accordance with one of the primary features of the present invention, an intermediate chamber 230 is operatively connected between bellows chamber 298 and piston chamber 299. Intermediate chamber 230 is generally circular and includes an internal volume $V_3$ formed within the intermediate chamber. Intermediate chamber 230 preferably has volume of from about 70 in.$^3$ to about 150 in.$^3$. Intermediate chamber 230 is formed from steel, plastic or other material that is sufficiently rigid to maintain a constant volume in the intermediate chamber during operation of the vehicle. An opening 274 is formed in retaining plate 286 and a first aligned opening 275 is formed in top plate 282 of piston 242. A further aligned opening 258 is formed in the top wall of intermediate chamber 230. Retaining plate opening 274, top plate opening 275 and intermediate chamber top wall opening 258 align with one another and are generally positioned adjacent to bumper 281 (FIG. 3). Retaining plate opening 274, top plate opening 275 and intermediate chamber top wall opening 258 have a horizontal cross section with a generally circular shape but may have other shapes including oval, elliptical, polygonal or other shapes without changing the overall concept or operation of the present invention. Retaining plate opening 274, top plate opening 275 and intermediate chamber top wall opening 258 together form a continuous opening 279 that allows intermediate chamber 230 to fluidly communicate with bellows air chamber 298. Alternatively, retaining plate opening 274, top plate opening 275 and intermediate chamber top wall opening 258 may include a spring pin (not shown), or a self-tapping screw with an integral opening, or other similar conduit that provides communication of fluid or air between piston bellows chamber 298 and intermediate chamber 230 during operation of the vehicle. Continuous opening 279 preferably has a diameter of from about 4 mm to about 8 mm. Continuous opening 279 serves as a means for providing restricted fluid communication between bellows chamber 298 and intermediate chamber 230.

In accordance with another primary feature of the present invention, an opening 259 is formed in the bottom wall of intermediate chamber 230. Intermediate chamber bottom wall opening 259 has a horizontal cross section with a generally circular shape but may have other shapes including oval, elliptical, polygonal or other shapes without changing the overall concept or operation of the present invention. Opening 259 can be formed anywhere on the intermediate chamber bottom wall, without changing the overall concept or operation of the present invention. Intermediate chamber bottom wall opening 259 preferably has a diameter of from about 4 mm to about 8 mm. Intermediate chamber bottom wall opening 259 serves as a means for providing restricted fluid communication between piston chamber 299 and intermediate chamber 230.

Continuous opening 279 and intermediate chamber bottom wall opening 259 serve as staged openings in intermediate chamber 230. The restricted communication of air between bellows air chamber 298, intermediate chamber 230 and piston chamber 299 via continuous opening 279 and intermediate chamber bottom wall opening 259, also described as staged openings, provides damping characteristics to first exemplary embodiment air spring 224 of the present invention. Preferably, the relative location of continuous opening 279 and intermediate chamber bottom wall opening 259 provides the longest passage through intermediate chamber 230 for the flow of air therebetween, whereby the full air volume of intermediate chamber 230 is utilized for providing damping characteristics.

More specifically, when axle 32 of axle/suspension system 10 experiences a jounce event, such as when the vehicle wheels encounter a curb or a raised bump in the road, the axle moves vertically upwardly toward the vehicle chassis. In such a jounce event, bellows chamber 298 is compressed by axle/suspension system 10 as the wheels of the vehicle travel over the curb or the raised bump in the road. The compression of air spring bellows chamber 298 causes the internal pressure of the bellows chamber to increase. As a result, a pressure differential is created between bellows chamber 298 and intermediate chamber 230. This pressure differential causes air to flow from bellows chamber 298, through continuous opening 279 into intermediate chamber 230. The flow of air into intermediate chamber 230 causes a pressure differential between intermediate chamber 230 and piston chamber 299. This pressure differential causes air to flow from intermediate chamber 230 through intermediate chamber bottom wall opening 259 into piston chamber 299. The flow of air back and forth through continuous opening 279, through intermediate chamber 230 and through intermediate chamber bottom wall opening 259 into piston chamber 299 causes damping to occur. Air will continue to flow back and forth between the piston chamber and the bellows chamber through intermediate chamber 230 until equilibrium is reached and the pressures in piston chamber 299, intermediate chamber 230, and bellows chamber 298 have equalized.

Conversely, when axle 32 of axle/suspension system 10 experiences a rebound event, such as when the vehicle wheels encounter a large hole or depression in the road, the axle moves vertically downwardly away from the vehicle chassis. In such a rebound event, bellows chamber 298 is expanded by axle/suspension system 10 as the wheels of the vehicle travel into the hole or depression in the road. The expansion of air spring bellows chamber 298 causes the internal pressure of the bellows chamber to decrease. As a result, a pressure differential is created between bellows chamber 298 and intermediate chamber 230. This pressure differential causes air to flow from intermediate chamber 230, through continuous opening 279 and into bellows chamber 298. As a result, a pressure differential is created between piston chamber 299 and intermediate chamber 230. This pressure differential causes air to flow from piston chamber 299, through intermediate chamber bottom wall opening 259 into intermediate chamber 230. The flow of air back and forth through continuous opening 279, through intermediate chamber 230 and through intermediate chamber bottom wall opening 259 causes damping to occur. Air will continue to flow back and forth between the bellows chamber and the piston chamber through the intermediate chamber until equilibrium is reached and the pressures in piston chamber 299, intermediate chamber 230, and bellows chamber 298 have equalized.

First exemplary embodiment air spring 224 with damping characteristics of the present invention overcomes the problems associated with prior art air spring 24 by eliminating the need for shock absorbers or allowing for the utilization of reduced size shock absorbers, thereby reducing complexity, saving weight and cost, and allowing the heavy-duty vehicle to haul more cargo. Moreover, elimination of the shock absorbers potentially eliminates costly repairs and/or maintenance costs associated with these systems.

First exemplary embodiment air spring 224 with damping characteristics of the present invention also overcomes the problems associated with prior art air spring 124 with damping features by providing an intermediate chamber with staged openings in fluid communication with the bellows chamber and the piston chamber that provide better airflow control, resulting in optimization of the damping characteristics of the air spring. First exemplary embodiment air spring 224 with damping characteristics of the present invention provides damping features to the axle/suspension system over a broader damping range to accommodate a broader range of loads and wheel motions, thereby expanding the operating range of the damping air spring. In addition, first exemplary embodiment air spring 224 with damping characteristics of the present invention reduces or eliminates frequency dependence. Moreover, first exemplary embodiment air spring 224 with damping characteristics of the present invention makes it possible to reduce the need for larger air volumes to increase damping characteristics, which in turn reduces the amount of space required for air springs by the axle/suspension system and allows more room and weight for payload or cargo. In addition, first exemplary embodiment air spring 224 of the present invention increases the ability to tune the damping provided by the air spring for different applications over a broader range of frequencies, for example, by allowing the opening size between intermediate chamber 230 and bellows chamber 298, and the opening size between the intermediate chamber and piston chamber 299 to be chosen to provide damping for a given load at the primary ride frequency (typically about 1 Hz or 2 Hz) and then to choose an intermediate chamber volume that will provide damping for the load at a secondary wheel hop frequency (typically about 10 Hz).

Figure 5:
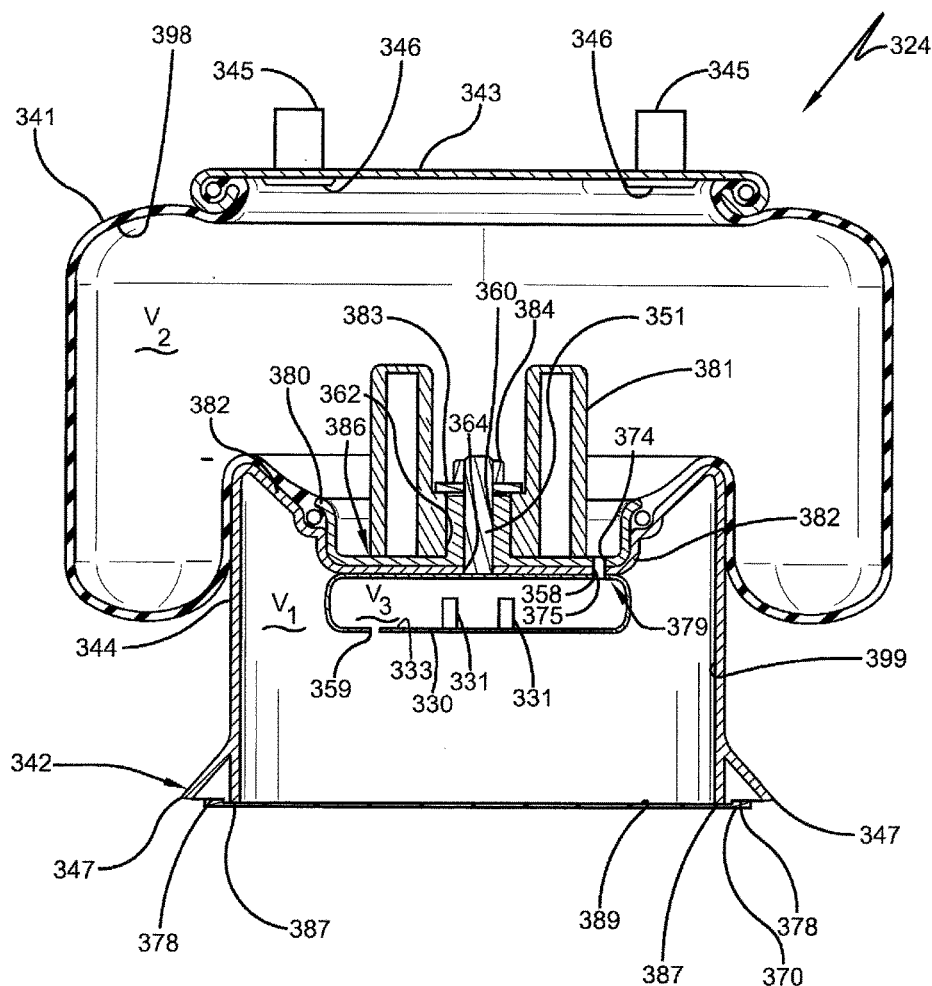
FIG. 5 is an elevational view in section of a second exemplary embodiment air spring with damping characteristics of the present invention, showing the intermediate chamber, including interior baffles, disposed within the piston of the air spring, the intermediate chamber being in fluid communication with the bellows chamber via a continuous opening formed through the intermediate chamber top wall, the piston top plate and the retaining plate, and showing the intermediate chamber also being in fluid communication with the piston chamber of the air spring via an intermediate chamber bottom wall opening.
Figure 5A:
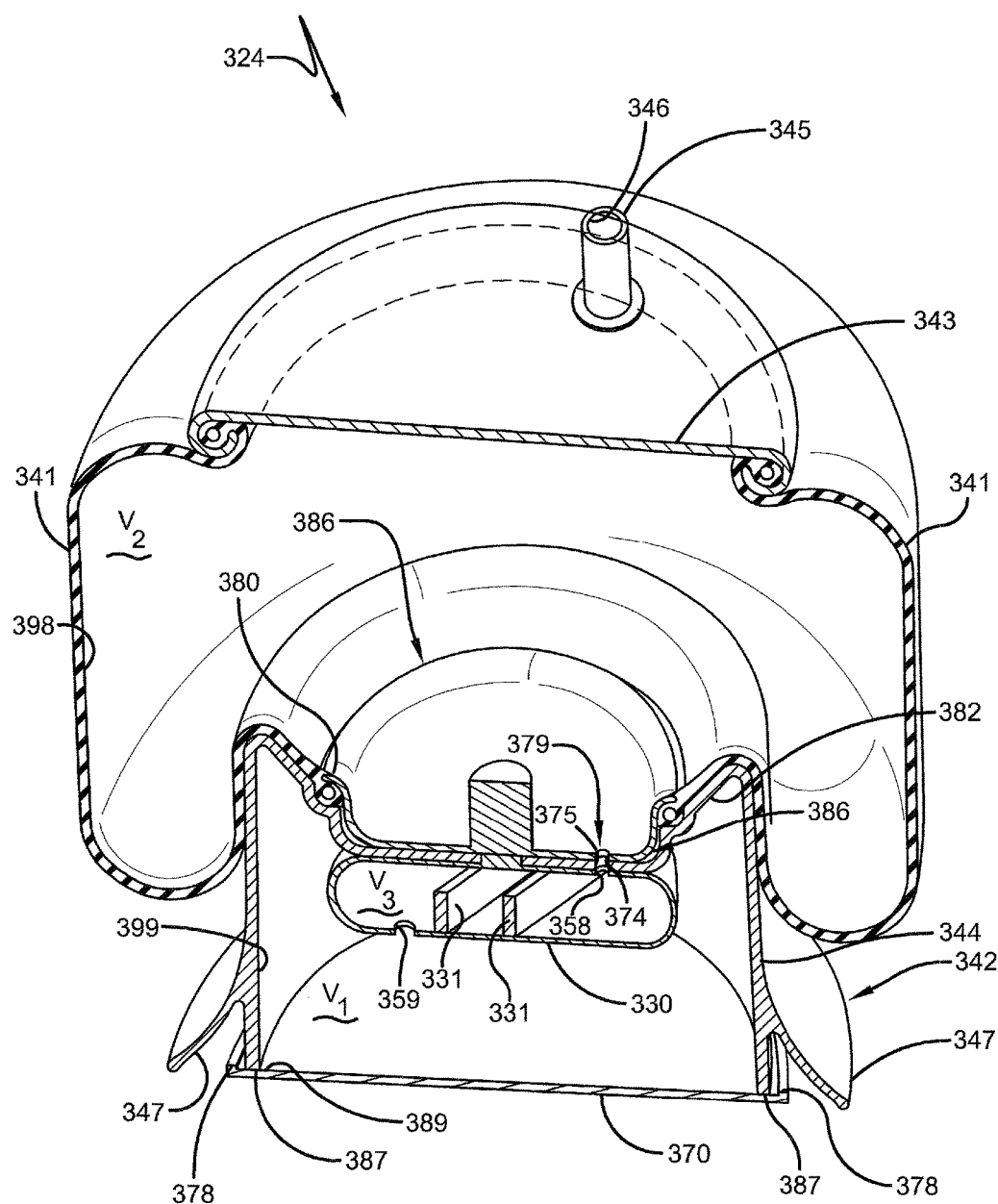
FIG. 5A is a perspective view in section of the second exemplary embodiment air spring with damping characteristics of the present invention shown in FIG. 5, with the bumper and fastener removed.
Figure 6:
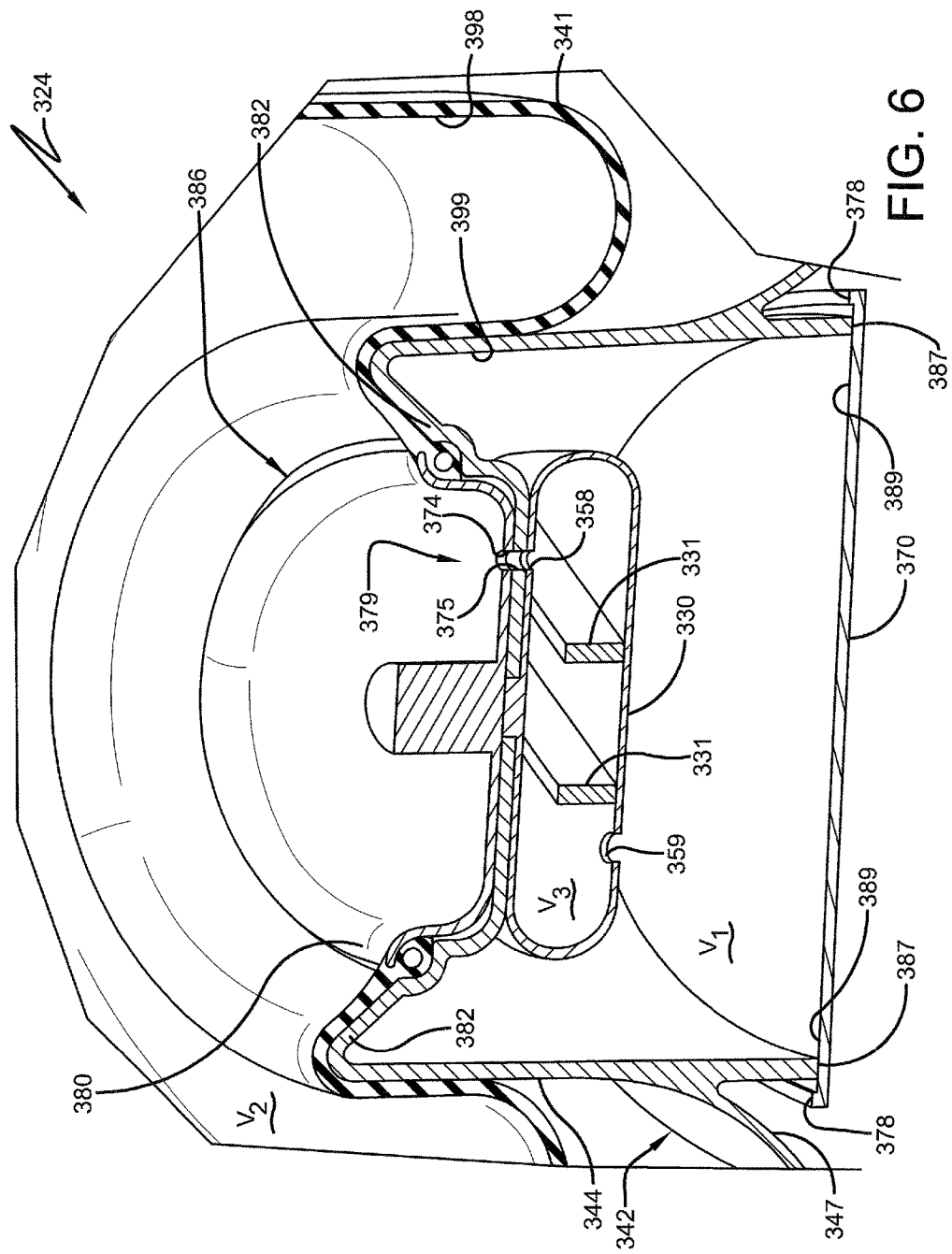
FIG. 6 is a greatly enlarged fragmentary perspective view in section of a portion of the air spring shown in FIG. 5A, showing the intermediate chamber top wall opening, the piston top plate opening and the retaining plate opening, with their respective openings aligned to form the continuous opening between the intermediate chamber and the bellows chamber, to allow fluid communication between the intermediate chamber and the bellows chamber, and also showing the intermediate chamber bottom wall opening formed through the bottom wall of the intermediate chamber to allow fluid communication between the intermediate chamber and the piston chamber, and showing the baffles disposed within the intermediate chamber.

Turning now to FIGS. 5, 5A and 6, a second exemplary embodiment air spring with damping characteristics of the present invention is shown at reference numeral 324. Like prior art air springs 24 and 124, air spring 324 of the present invention is incorporated into an axle/suspension system having a structure similar to axle/suspension system 10, or other similar air-ride axle/suspension system, but without shock absorbers. Second exemplary embodiment air spring 324 includes a bellows 341, a bellows top plate 343, and a piston 342. Top plate 343 includes a pair of fasteners 345, each formed with an opening 346. Fasteners 345 are utilized to mount air spring 324 to an air spring plate (not shown), that in turn is mounted to the main member of the vehicle (not shown). Piston 342 is generally cylindrical-shaped and includes a sidewall 344, a flared portion 347, and a top plate 382.

With particular reference to FIG. 5, a bumper 381 is disposed on a top surface of a retaining plate 386. Retaining plate 386, bumper 381 and piston top plate 382 are each formed with an opening 360, 362, and 364, respectively. A fastener 351 is disposed through piston top plate opening 364, retaining plate opening 360, and bumper opening 362. A washer 383 and a nut 384 are disposed on fastener 351 to mount bumper 381 and retaining plate 386 on the top surface of piston top plate 382. Retaining plate 386 includes a flared end 380 that is molded into the lower end of bellows 341, which holds the bellows in place on piston 342 and forms an airtight seal between the bellows and the piston. It should be understood that flared end 380 of retaining plate 386 could also be separate from the lower end of bellows 341, whereby the flared end would capture and hold the lower end of the bellows in place on piston 342 to form an airtight seal between the bellows and the piston, without changing the overall concept or operation of the of the present invention. Bellows 341, retaining plate 386, and bellows top plate 343 generally define a bellows chamber 398 having an interior volume $V_2$ at standard ride height. Bellows chamber 398 preferably has a volume of from about 305 in.$^3$ to about 915 in.$^3$. More preferably, bellows chamber 398 has a volume of about 485 in.$^3$. Bumper 381 is formed from rubber, plastic or other compliant material and extends generally upwardly from retaining plate 386 mounted on piston top plate 382. Bumper 381 serves as a cushion between piston top plate 382 and the underside of bellows top plate 343 in order to prevent the plates from contacting one another and causing damage during operation of the vehicle.

A generally circular disc 370 is attached or mated to the bottom of piston 342 of second exemplary embodiment air spring 324 of the present invention. Circular disc 370 is formed with an opening (not shown) for fastening piston 342 to beam rear end top plate 65 (FIG. 1), directly or utilizing a beam mounting pedestal (not shown) in order to attach piston 342 of air spring 324 to beam 18 (FIG. 1). Once attached, a top surface 389 of circular disc 370 is mated to a lower surface 387 of sidewall 344 of piston 342 of second exemplary embodiment air spring 324 to provide an airtight seal between disc 370 and piston 342. Circular disc 370 is formed with a continuously raised lip 378 on its top surface along the periphery of the disc, with the lip being disposed generally between flared portion 347 and sidewall 344 of piston 342 when disc 370 is mated to the piston. Optionally, the attachment of disc 370 to piston 342 may be supplemented by additional attachment means such as welding, soldering, crimping, friction welding, an O-ring, a gasket, adhesive or the like. Alternatively, the attachment of disc 370 to piston 342 may be accomplished via other means, such as fasteners, welding, soldering, crimping, friction welding, adhesives and the like, without changing the overall concept or operation of the present invention. Circular disc 370 may be composed of metal, plastic, and/or composite material, or other materials known to those skilled in the art, without changing the overall concept or operation of the present invention. Disc 370 may optionally include a groove (not shown) formed in top surface 389 disposed circumferentially around the disc, and configured to mate with a downwardly extending hub of the piston in order to reinforce the connection of the disc to the bottom of piston 342. An O-ring or gasket material could optionally be disposed in the groove to ensure an airtight fit of disc 370 to piston 342. Once disc 370 is attached to piston 342, top plate 382, sidewall 344, and the disc, define a piston chamber 399 having an interior volume $V_1$. Piston chamber 399 is generally able to withstand the required burst pressure of the axle/suspension system 10 during vehicle operation. Piston chamber 399 preferably has a volume of from about 150 in.$^3$ to about 550 in.$^3$. More preferably, piston chamber 399 has a volume of about 240 in.$^3$.

In accordance with one of the primary features of the present invention, an intermediate chamber 330 is operatively connected between bellows chamber 398 and piston chamber 399. Intermediate chamber 330 is generally circular and includes an internal volume $V_3$ formed within the intermediate chamber. Intermediate chamber 330 preferably has volume of from about 70 in.$^3$ to about 150 in.$^3$. Intermediate chamber 330 is formed from steel, plastic or other material that is sufficiently ridged to maintain a constant volume in the intermediate chamber during operation of the vehicle. An opening 374 is formed in retaining plate 386 and a first aligned opening 375 is formed in top plate 382 of piston 342. A further aligned opening 358 is formed in the top wall of intermediate chamber 330. Retaining plate opening 374, top plate opening 375 and intermediate chamber top wall opening 358 align with one another and are generally positioned adjacent to bumper 381. Retaining plate opening 374, top plate opening 375 and intermediate chamber top wall opening 358 have a horizontal cross section with a generally circular shape but may have other shapes including oval, elliptical, polygonal or other shapes without changing the overall concept or operation of the present invention. Retaining plate opening 374, top plate opening 375 and intermediate chamber top wall opening 358 together form a continuous opening 379 that allows intermediate chamber 330 to fluidly communicate with bellows air chamber 398. Alternatively, retaining plate opening 374, top plate opening 375 and intermediate chamber top wall opening 358 may include a spring pin (not shown), or a self-tapping screw with an integral opening, or other similar conduit that provides communication of fluid or air between piston bellows chamber 398 and intermediate chamber 330 during operation of the vehicle. Continuous opening 379 preferably has a diameter of from about 4 mm to about 8 mm. Continuous opening 379 serves as a means for providing restricted fluid communication between bellows chamber 398 and intermediate chamber 330.

In accordance with another primary feature of the present invention, an opening 359 is formed in the bottom wall of intermediate chamber 330. Intermediate chamber bottom wall opening 359 has a horizontal cross section with a generally circular shape but may have other shapes including oval, elliptical, polygonal or other shapes without changing the overall concept or operation of the present invention. Opening 359 can be formed anywhere on the intermediate chamber bottom wall, without changing the overall concept or operation of the present invention. Intermediate chamber bottom wall opening 359 preferably has a diameter of from about 4 mm to about 8 mm. Intermediate chamber bottom wall opening 359 serves as a means for providing restricted fluid communication between piston chamber 399 and intermediate chamber 330.

Continuous opening 379 and intermediate chamber bottom wall opening 359 serve as staged openings in intermediate chamber 330. The restricted communication of air between bellows air chamber 398, intermediate chamber 330 and piston chamber 399 via continuous opening 379 and intermediate chamber bottom wall opening 359, also described as staged openings, provides damping characteristics to second exemplary embodiment air spring 324 of the present invention. Preferably, the relative location of continuous opening 379 and intermediate chamber bottom wall opening 359 provides the longest passage way through intermediate chamber 330 for the flow of air therebetween, whereby the full air volume of intermediate chamber 330 could be utilized for providing damping characteristics.

In accordance with another important feature of second exemplary embodiment air spring 324 with damping characteristics of the present invention, intermediate chamber 330 includes a pair of baffles 331 that are generally spaced from one another and extend upwardly from an interior surface 333 of the bottom wall of intermediate chamber 330. Baffles 331 have a generally rectangular shape, but it should be understood that the baffles could have other shapes and sizes without changing the overall concept or operation of the present invention. Baffles 331 are disposed between continuous opening 379 and intermediate chamber bottom opening 359 and serve as a means to control the flow of air through intermediate chamber 330 during operation of the vehicle. Alternatively, intermediate chamber 330 may include a single or more than a pair of baffles 331 that are disposed between continuous opening 379 and intermediate chamber bottom opening 359. Having now described the structure of second exemplary embodiment air spring 324 with damping characteristics of the present invention, the operation of the air spring will be described in detail below.

When axle 32 of axle/suspension system 10 experiences a jounce event, such as when the vehicle wheels encounter a curb or a raised bump in the road, the axle moves vertically upwardly toward the vehicle chassis. In such a jounce event, bellows chamber 398 is compressed by axle/suspension system 10 as the wheels of the vehicle travel over the curb or the raised bump in the road. The compression of air spring bellows chamber 398 causes the internal pressure of the bellows chamber to increase. As a result, a pressure differential is created between bellows chamber 398 and intermediate chamber 330. This pressure differential causes air to flow from bellows chamber 398, through continuous opening 379 into intermediate chamber 330. The flow of air into intermediate chamber 330 causes a pressure differential between intermediate chamber 330 and piston chamber 399. This pressure differential causes air to flow from intermediate chamber 330 through intermediate chamber bottom wall opening 359 into piston chamber 399. The flow of air back and forth through continuous opening 379, through intermediate chamber 330, across baffles 331 and through intermediate chamber bottom wall opening 359 into piston chamber 399 causes damping to occur. Air will continue to flow back and forth between the piston chamber and the bellows chamber through intermediate chamber 330 and across baffles 331 until equilibrium is reached and the pressures in piston chamber 399, intermediate chamber 330 and bellows chamber 398 have equalized. Baffles 331 control and disrupt the flow of air from bellows chamber 398 into piston chamber 399, and vice versa, through intermediate chamber 330 when the flow of air passes across baffles 331 disposed between continuous opening 379 and intermediate chamber bottom opening 359. By having baffles 331 in intermediate chamber 330, it is possible to reduce the size of piston chamber 399 and/or bellows chamber 398 of air spring 324.

Conversely, when axle 32 of axle/suspension system 10 experiences a rebound event, such as when the vehicle wheels encounter a large hole or depression in the road, the axle moves vertically downwardly away from the vehicle chassis. In such a rebound event, bellows chamber 398 is expanded by axle/suspension system 10 as the wheels of the vehicle travel into the hole or depression in the road. The expansion of air spring bellows chamber 398 causes the internal pressure of the bellows chamber to decrease. As a result, a pressure differential is created between bellows chamber 398 and intermediate chamber 330. This pressure differential causes air to flow from intermediate chamber 330, across baffles 331, through continuous opening 379 and into bellows chamber 398. As a result, a pressure differential is created between piston chamber 399 and intermediate chamber 330. This pressure differential causes air to flow from piston chamber 399, through intermediate chamber bottom wall opening 359 into intermediate chamber 330. The flow of air back and forth through continuous opening 379, through intermediate chamber 330, across baffles 331 and through intermediate chamber bottom wall opening 359 causes damping to occur. Air will continue to flow back and forth between the bellows chamber and the piston chamber, through the intermediate chamber and across baffles 331 until equilibrium is reached and the pressures in piston chamber 399, intermediate chamber 330 and bellows chamber 398 have equalized. Baffles 331 control and disrupt the flow of air from piston chamber 399 into bellows chamber 398, and vice versa, through intermediate chamber 330 when the flow of air passes across baffles 331 disposed fluidly between intermediate chamber bottom opening 359 and continuous opening 379. By having baffles 331 in intermediate chamber 330, it is possible to reduce the size of piston chamber 399 and/or bellows chamber 398 of air spring 324.

Second exemplary embodiment air spring 324 with damping characteristics of the present invention overcomes the problems associated with prior art air spring 24 by eliminating the need for shock absorbers or allowing for the utilization of reduced size shock absorbers, thereby reducing complexity, saving weight and cost, and allowing the heavy-duty vehicle to haul more cargo. Moreover, elimination of the shock absorbers potentially eliminates costly repairs and/or maintenance costs associated with these systems.

Second exemplary embodiment air spring 324 with damping characteristics of the present invention also overcomes the problems associated with prior art air spring 124 with damping features by providing an intermediate chamber with baffles and staged openings in fluid communication with the bellows chamber and the piston chamber that provide better airflow control, resulting in optimization of the damping characteristics of the air spring. Second exemplary embodiment air spring 324 with damping characteristics of the present invention provides damping features to the axle/suspension system over a broader damping range to accommodate a broader range of loads and wheel motions, thereby expanding the operating range of the damping air spring. In addition, second exemplary embodiment air spring 324 with damping characteristics of the present invention reduces or eliminates frequency dependence. Moreover, second exemplary embodiment air spring 324 with damping characteristics of the present invention makes it possible to reduce the need for larger air volumes to increase damping features, which in turn reduces the amount of space for air springs required by the axle/suspension system and allows more room and weight for payload or cargo. In addition, second exemplary embodiment air spring 324 of the present invention increases the ability to tune the damping provided by the air spring for different applications over a broader range of frequencies, for example, by allowing the opening sizes between intermediate chamber 330 and bellows chamber 398, and the opening sizes between the intermediate chamber and piston chamber 399 to be chosen to provide damping for a given load at the primary ride frequency (typically about 1 Hz or 2 Hz) and then to choose an intermediate chamber volume that will provide damping for the load at a secondary wheel hop frequency (typically about 10 Hz).

It is contemplated that exemplary embodiment air springs 224,324 of the present invention could be utilized on tractor-trailers or heavy-duty vehicles, such as buses, trucks, trailers and the like, having one or more than one axle without changing the overall concept or operation of the present invention. It is further contemplated that exemplary embodiment air springs 224,324 of the present invention could be utilized on vehicles having frames or subframes which are moveable or non-movable without changing the overall concept or operation of the present invention. It is yet even further contemplated that exemplary embodiment air springs 224,324 of the present invention could be utilized on all types of air-ride leading and/or trailing arm beam-type axle/suspension system designs known to those skilled in the art without changing the overall concept or operation of the present invention. It is also contemplated that exemplary embodiment air springs 224,324 of the present invention could be utilized on axle/suspension systems having an overslung/top-mount configuration or an underslung/bottom-mount configuration, without changing the overall concept or operation of the present invention. It is also contemplated that exemplary embodiment air springs 224,324 of the present invention could be utilized in conjunction with other types of air-ride rigid beam-type axle/suspension systems such as those using U-bolts, U-bolt brackets/axle seats and the like, without changing the overall concept or operation of the present invention. It is further contemplated that exemplary embodiment air springs 224,324 of the present invention could be formed from various materials, including composites, metal and the like, without changing the overall concept or operation of the present invention. It is even contemplated that exemplary embodiment air springs 224, 324 could be utilized in combination with prior art shock absorbers and other similar devices and the like, without changing the overall concept or operation of the present invention.

It is contemplated that discs 270,370 may be attached to pistons 242,342, respectively, utilizing other attachments such as soldering, coating, crimping, welding, snapping, screwing, O-ring, sonic, glue, press, melting, expandable sealant, press-fit, bolt, latch, spring, bond, laminate, tape, tack, adhesive, shrink fit, and/or any combination listed without changing the overall concept or operation of the present invention. It is even contemplated that discs 270,370 may be composed of materials known by those in the art other than metal, plastic, and/or composite material without changing the overall concept or operation of the present invention.

It is contemplated that intermediate chambers 230,330 could be located within pistons 242,342, respectively, as described and shown above, or they could be located within bellows chamber 298,398, respectively, or outside of the air spring and connected to the bellows chamber and the piston chamber via conduits, without changing the overall concept or operation of the present invention. It is further contemplated that intermediate chambers 230,330, could be formed from a void or space formed between the bellows chamber and the piston chamber, such as in a space between the bellows and the piston top plate, without changing the overall concept or operation of the present invention. It is also contemplated that the sequence of the chambers, bellows chambers 298,398, intermediate chambers 230,330, and piston chambers 299,399, could be rearranged into any order or sequence without changing the overall concept or operation of the present invention.

It is contemplated that continuous openings 279,379 of first and second exemplary embodiments 224,324 could be formed in a different location within retaining plates 286,386 and top plates 282,382 of pistons 242,342, respectively, and relative to bumpers 281,381, respectively, without changing the overall concept or operation of the present invention. It is further contemplated that any number of openings may be formed in retaining plates 286,386 and top plates 282,382, of pistons 242,342, respectively, and in the top wall of intermediate chambers 230,330 such as multiple small openings without changing the overall concept or operation of the present invention. It is also contemplated that intermediate chamber bottom wall openings 259,359 of the present invention could be formed anywhere relative to continuous opening 279,379, and also anywhere on intermediate chambers 230,330, respectively, without changing the overall concept or operation of the present invention.

It is contemplated that the concepts shown in exemplary embodiment air springs 224,324 of the present invention could be utilized in any type of air spring utilized in conjunction with heavy-duty vehicles, without changing the overall concept or operation of the present invention.

In the foregoing description, certain terms have been used for brevity, clearness, and understanding, but no unnecessary limitations are to be implied therefrom beyond the requirements of the prior art, because such terms are used for descriptive purposes and intended to be broadly construed.

The present invention has been described with reference to specific embodiments. It is to be understood that this illustration is by way of example and not by way of limitation. Potential modifications and alterations will occur to others upon a reading and understanding of this disclosure, and it is understood that the invention includes all such modifications, alterations, and equivalents thereof.

Accordingly, the damping air spring with staged openings of the present invention is simplified, provides an effective, safe, inexpensive and efficient structure and method which achieves all the enumerated objectives, provides for eliminating difficulties encountered with prior art air springs with or without damping characteristics, and solves problems and obtains new results in the art.

Having now described the features, discoveries and principles of the invention, the manner in which the damping air spring with staged openings is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. An air spring with damping characteristics for a suspension assembly of a heavy-duty vehicle comprising:
    a first chamber formed from a flexible material and containing a variable volume during operation of said vehicle;
    a second chamber;
    an intermediate chamber operatively connected to said first chamber and said second chamber, said intermediate chamber having a volume less than a volume of said first chamber and less than a volume of said second chamber;
    a first means for providing restricted fluid communication between the first chamber and said intermediate chamber; and
    a second means for providing restricted fluid communication between the intermediate chamber and the second chamber beneath said intermediate chamber, said first and second means creating a radially offset path of restricted fluid communication in order to utilize a full volume of said intermediate chamber to provide damping characteristics to said air spring during operation of said heavy-duty vehicle, wherein said damping characteristics are exhibited across a broad range of frequencies.

2. The air spring with damping characteristics for a suspension system of a heavy-duty vehicle of claim 1, said first chamber comprising a bellows chamber.

3. The air spring with damping characteristics for a suspension system of a heavy-duty vehicle of claim 1, said second chamber comprising a piston chamber.

4. The air spring with damping characteristics for a suspension system of a heavy-duty vehicle of claim 1, said intermediate chamber comprising a piston chamber.

5. The air spring with damping characteristics for a suspension system of a heavy-duty vehicle of claim 1, said intermediate chamber including at least one baffle disposed within said intermediate chamber.

6. The air spring with damping characteristics for a suspension system of a heavy-duty vehicle of claim 1, said first chamber having a volume of from about 305 in.$^3$ to about 915 in.$^3$.

7. The air spring with damping characteristics for a suspension system of a heavy-duty vehicle of claim 1, said second chamber having a volume of from about 150 in.$^3$ to about 550 in.$^3$.

8. The air spring with damping characteristics for a suspension system of a heavy-duty vehicle of claim 1, said intermediate chamber having a volume of from about 70 in.$^3$ to about 150 in.$^3$.

9. The air spring with damping characteristics for a suspension system of a heavy-duty vehicle of claim 1, said intermediate chamber being located between said first chamber and said second chamber.

10. The air spring with damping characteristics for a suspension system of a heavy-duty vehicle of claim 1, said first means for providing restricted fluid communication between said intermediate chamber and said first chamber comprises a first opening and said second means for providing restricted fluid communication between the intermediate chamber and said second chamber is a second opening.

11. The air spring with damping characteristics for a suspension system of a heavy-duty vehicle of claim 10, said first opening and said second opening being staged vertically from one another.

12. The air spring with damping characteristics for a suspension system of a heavy-duty vehicle of claim 10, said first opening being formed on a top plate of said intermediate chamber, the first opening being continuous between said intermediate chamber and said first chamber.

13. The air spring with damping characteristics for a suspension system of a heavy-duty vehicle of claim 12, said first opening having a diameter of from about 4 mm to about 8 mm.

14. The air spring with damping characteristics for a suspension system of a heavy-duty vehicle of claim 12, said first opening including a horizontal cross section comprising a shape chosen from the group consisting of a circle, an oval, an ellipse and a polygon.

15. The air spring with damping characteristics for a suspension system of a heavy-duty vehicle of claim 10, said second opening being formed on a bottom plate of said intermediate chamber, the second opening being between said intermediate chamber and said second chamber.

16. The air spring with damping characteristics for a suspension system of a heavy-duty vehicle of claim 15, said second opening having a diameter of from about 4 mm to about 8 mm.

17. The air spring with damping characteristics for a suspension system of a heavy-duty vehicle of claim 15, said second opening including a horizontal cross section comprising a shape chosen from the group consisting of a circle, an oval, and ellipse and a polygon.

* * * * *

UNITED STATES PATENT AND TRADEMARK OFFICE
CERTIFICATE OF CORRECTION

PATENT NO. : 10,118,453 B2
APPLICATION NO. : 15/364439
DATED : November 6, 2018
INVENTOR(S) : Damon Delorenzis It is certified that error appears in the above-identified patent and that said Letters Patent is hereby corrected as shown below:

In the Claims

Amend Claim 2, Column 20, Lines 33-34, after the word "a" delete "suspension system" and insert --suspension assembly--.

Amend Claim 3, Column 20, Lines 36-37, after the word "a" delete "suspension system" and insert --suspension assembly--.

Amend Claim 4, Column 20, Lines 38-39, after the word "a" delete "suspension system" and insert --suspension assembly--.

Amend Claim 5, Column 20, Lines 41-42, after the word "a" delete "suspension system" and insert --suspension assembly--.

Amend Claim 6, Column 20, Lines 45-46, after the word "a" delete "suspension system" and insert --suspension assembly--.

Amend Claim 7, Column 20, Lines 49-50, after the word "a" delete "suspension system" and insert --suspension assembly--.

Amend Claim 8, Column 20, Lines 53-54, after the word "a" delete "suspension system" and insert --suspension assembly--.

Amend Claim 9, Column 20, Lines 57-58, after the word "a" delete "suspension system" and insert --suspension assembly--.

Amend Claim 10, Column 20, Lines 61-62, after the word "a" delete "suspension system" and insert --suspension assembly--.

Signed and Sealed this
Fifteenth Day of January, 2019

Andrei Iancu
*Director of the United States Patent and Trademark Office*

CERTIFICATE OF CORRECTION (continued)
U.S. Pat. No. 10,118,453 B2

Amend Claim 11, Column 21, Lines 1-2, after the word "a" delete "suspension system" and insert --suspension assembly--.

Amend Claim 12, Column 21, Lines 5-6, after the word "a" delete "suspension system" and insert --suspension assembly--.

Amend Claim 13, Column 21, Lines 10-11, after the word "a" delete "suspension system" and insert --suspension assembly--.

Amend Claim 14, Column 21, Lines 14-15, after the word "a" delete "suspension system" and insert --suspension assembly--.

Amend Claim 15, Column 21, Lines 19-20, after the word "a" delete "suspension system" and insert --suspension assembly--.

Amend Claim 16, Column 21, Lines 24-25, after the word "a" delete "suspension system" and insert --suspension assembly--.

Amend Claim 17, Column 21, Lines 28-29, after the word "a" delete "suspension system" and insert --suspension assembly--.

Amend Claim 17, Column 21, Line 32, before the word "ellipse" delete "and" and insert --an--.